(12) United States Patent
Liu et al.

(10) Patent No.: US 11,515,807 B1
(45) Date of Patent: Nov. 29, 2022

(54) LINE FREQUENCY COMMUTATED VOLTAGE SOURCE CONVERTERS FOR MULTIPHASE MODULAR MULTILEVEL CONVERTERS

(71) Applicant: VIRGINIA TECH INTELLECTUAL PROPERTIES, INC., Blacksburg, VA (US)

(72) Inventors: Jian Liu, Blacksburg, VA (US); Dong Dong, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/477,678

(22) Filed: Sep. 17, 2021

(51) Int. Cl.
*H02M 7/42* (2006.01)
*H02M 7/483* (2007.01)
*H02M 7/5387* (2007.01)

(52) U.S. Cl.
CPC ..... *H02M 7/4835* (2021.05); *H02M 7/53871* (2013.01)

(58) Field of Classification Search
CPC .. H02M 7/42; H02M 7/4835; H02M 7/53871; H02M 7/53873; H02M 7/53875; H02M 7/5387
See application file for complete search history.

(56) References Cited

U.S. PATENT DOCUMENTS

| | | | |
|---|---|---|---|
| 10,886,860 B2 * | 1/2021 | Haryani | H02M 7/53876 |
| 2015/0124506 A1 * | 5/2015 | Sahoo | H02M 5/225 363/126 |
| 2017/0132337 A1 * | 5/2017 | Li | G06F 30/367 |

* cited by examiner

*Primary Examiner* — Adolf D Berhane
(74) *Attorney, Agent, or Firm* — Thomas Horstemeyer, LLP

(57) ABSTRACT

Aspects are described for line frequency commutated voltage source converters for multiphase modular multilevel converters. A voltage source converter (VSC) capacitor voltage of a multiphase VSC of a multiphase power converter can be identified. The multiphase VSC can include a half-bridge circuit for each phase of the multiphase power converter. A circuit parameter can be identified and utilized to determine an arm voltage of an arm of a branch of the multiphase converter. Switch control signals can be generated to insert or bypass the VSC capacitor for the arm of the branch of the multiphase converter device, based at least in part on a comparison between the arm voltage and the VSC capacitor voltage.

20 Claims, 12 Drawing Sheets

LINE FREQUENCY COMMUTATED VOLTAGE SOURCE CONVERTERS FOR MULTIPHASE MODULAR MULTILEVEL CONVERTERS

GOVERNMENT RIGHTS STATEMENT

This invention was made with government support under Grant No. ECCS2022397, awarded by the National Science Foundation. The government has certain rights in this invention.

BACKGROUND

Modular multilevel converter topologies are popular for use in many medium and high voltage applications. Modular multilevel converter topologies can be modular, scalable, and reliable in these applications. However, modular multilevel converter topologies can suffer from several constraints. For example, the number of semiconductor devices per converter system can be high. Modular multilevel converter designs can also require direct current (DC)-link capacitors, which increase the construction cost and overall system volume.

In order to solve this issue, various new topologies have been proposed to improve modular multilevel converter (MMC) power density. Some of these topologies feature the combination of high voltage series insulated-gate bipolar transistors (IGBTs) and chain-link structures used in modular multilevel converters and can be referred to as hybrid modular multilevel converters. Some examples can include alternate arm converters, H-bridge hybrid modular converters, parallel hybrid converters, hybrid three-level converters with alternating current (AC)-side cascaded full-bridge submodules, and modular embedded multilevel converters. All the aforementioned topologies can address one or more problems in modular multilevel converters. However, there is still a need for more variable and more efficient solutions for modular multilevel converters.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to using one or more multiphase line frequency commutated voltage source converters (VSCs) for modular multilevel converter (MMC) and hybrid modular multilevel converter (HMMC) topologies. MMC topologies are popular for use in many medium and high voltage applications. However, MMC topologies can suffer from several constraints. For example, the number of semiconductor devices per converter system can be high. MMC designs can also require direct current (DC)-link capacitors, which increase the construction cost and overall system volume. Although there are a number of variants of MMCs, there is still a need for more variable and more efficient solutions for MMCs. The present disclosure describes control methods of line frequency commutated VSCs for MMC and HMMC topologies and introduces topologies for multiphase HMMCs with multiphase line frequency commutated VSCs. Compared with traditional technologies, the device number and capacitor size can be reduced significantly. Therefore, smaller volume and construction cost can be achieved.

Figure 1A:
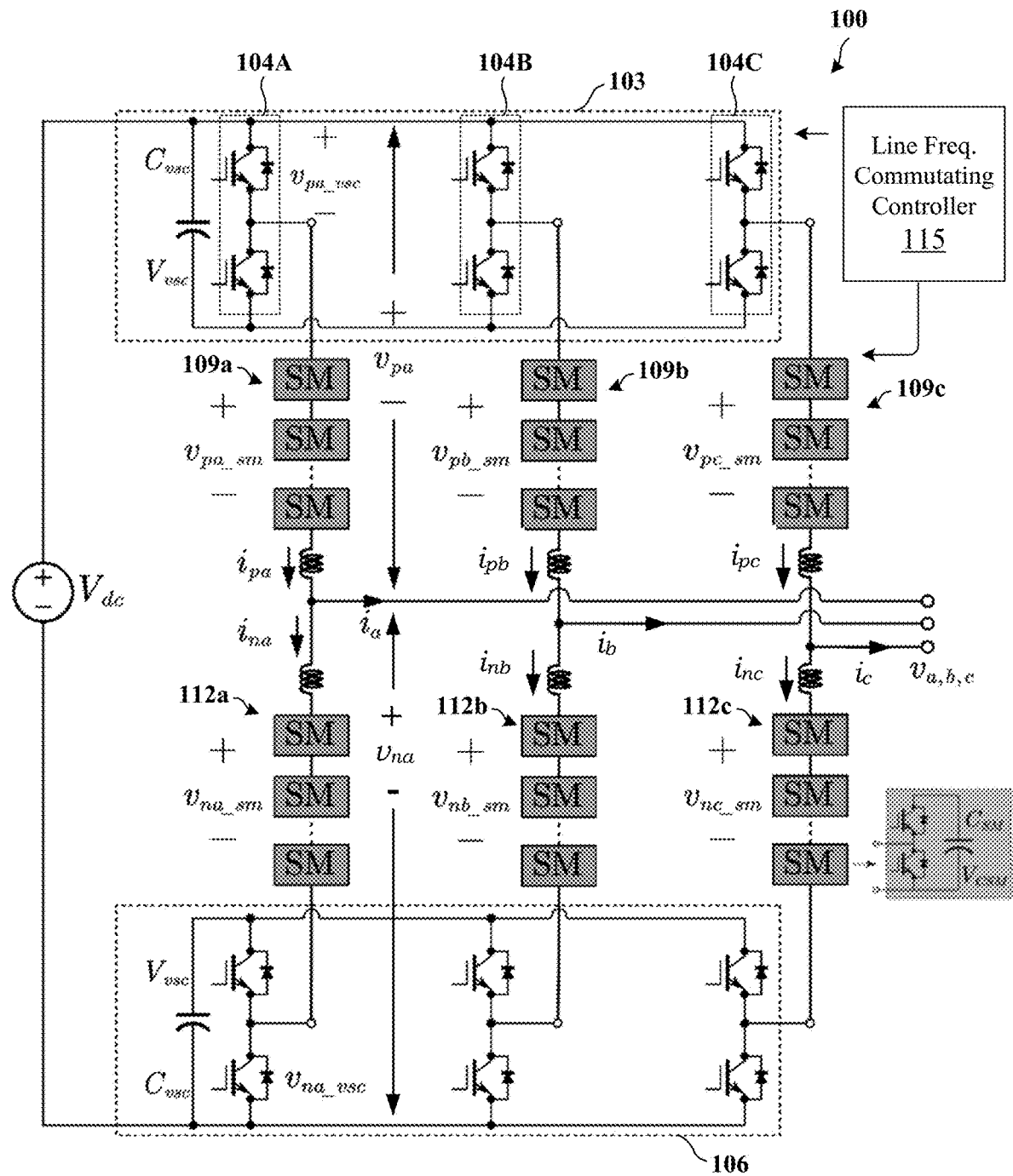
FIG. 1A illustrates an example of a modular multilevel converter with a multiphase line frequency commutated voltage source converter according to embodiments of the present disclosure.

FIG. 1A illustrates an example of a MMC 100 with a multiphase line frequency commutated voltage source converter. The MMC 100 is one example of a power converter system that can incorporate the improvements described herein. The improvements can be applied to other types and topologies of power converters. The MMC 100 can include a number of branches for multiphase or polyphase operation, such as three branches for a three phase operation as shown. However, any number of phases, such as one phase, two phase, three phase, four phase, five phase, and so on can be used. The MMC 100 can be capable of AC-to-DC and DC-to-AC conversions in the various embodiments. The MMC 100 includes an upper multiphase line frequency commutated VSC 103 and a lower multiphase line frequency commutated VSC 106. In some cases, the upper multiphase line frequency commutated VSC 103 and the lower multiphase line frequency commutated VSC 106 can be considered upper and lower components of a single VSC.

The MMC 100 can take (or generate) a voltage $V_{dc}$ across DC nodes of a DC bus. A positive or upper DC node can connect to an upper side of the upper multiphase line frequency commutated VSC 103. The upper multiphase line frequency commutated VSC 103 can include a single VSC capacitor $C_{VSC}$, connected in parallel with a number of VSC half-bridge circuits 104A-104C (collectively "VSC half-bridge circuits 104"). The number of VSC half-bridge circuits 104 can correspond to the number of phases of the MMC 100. Three VSC half-bridge circuits 104 are used in the VSC 103 of the MMC 100 shown in FIG. 1A, because MMC 100 is designed for three phase operation. The voltage $v_{pa\_vsc}$ can refer to a voltage from the upper DC node to a midpoint of each VSC half-bridge circuit 104 of the upper multiphase line frequency commutated VSC 103. Each branch can include its own $v_{pa\_vsc}$ value. The upper sides of the upper switches of the three branch VSC half-bridge circuits 104 of the upper multiphase line frequency commutated VSC 103 can be connected to the upper DC node of the MMC 100. The lower sides of the lower switches of each of the three branch VSC half-bridge circuits 104 of the upper multiphase line frequency commutated VSC 103 can be connected to each other as shown in FIG. 1A.

In some cases, a capacitor bank of series and/or parallel capacitors can be provided rather than a single capacitor single VSC capacitor $C_{VSC}$. The VSC capacitor of the upper arms of the MMC 100 can also be referred to as an upper VSC capacitor $C_{VSCU}$. The switches used in the VSC half-bridge circuits 104 of the upper multiphase line frequency commutated VSC 103 can include one or more insulated-gate bipolar transistors (IGBTs) and can be referred to as an IGBT stack. The switch or stack of switching devices used in the upper multiphase line frequency commutated VSC 103 can have a higher voltage rating and lower chopping speed with respect to the switching devices in each submodule of the upper series submodule chain links 109a, 109b, and 109c.

In each branch corresponding to a phase of the MMC 100, the midpoint of each half-bridge circuit of the upper multiphase line frequency commutated VSC 103 can be connected in series with an upper series submodule chain link 109, such as the branch series submodule chain link 109a, the branch series submodule chain link 109b, and the branch series submodule chain link 109c. Each branch series submodule chain link 109a, 109b, and 109c (collectively "chain links 109," individually "chain link 109") can include a number of submodules. While three are shown, there can be any number of half-bridge submodules in a series submodule chain link 109. As shown in the inset in FIG. 1A, each of the half-bridge submodules can include a DC capacitor submodule capacitor $C_{SM}$ connected across the half-bridge circuit, each with a submodule capacitor voltage of $V_{CSM}$.

An output voltage across the series submodule chain link 109a for the upper arm of branch A can be $v_{pa\_sm}$. This value can be equated, approximated, or otherwise related to a voltage $v_{cpa}$ that is a sum of the submodule capacitor voltages $V_{CSM}$, or $n*V_{CSM}$ where n is a number of the submodules in the series submodule chain link 109a. However, n can also be a number of the submodules that are connected in series rather than shorted using the corresponding half-bridge circuits of the series submodule chain link 109a. A controller such as the line frequency commutating controller 115 can generate signals to connect or short each submodule. An arm voltage $v_{pa}$ for the upper arm of branch A can be a sum of $v_{pa\_sm}$ and $v_{pa\_vsc}$. A voltage across the branch series submodule chain link 109b for branch B can be $v_{pb\_sm}$. While not shown, the arm voltage $v_{pb}$ for branch B can be a sum of $v_{pb\_sm}$ and $v_{pb\_vsc}$. A voltage across the branch series submodule chain link 109c for branch C can be $v_{pc\_sm}$. While not shown, the arm voltage $v_{pc}$ for branch C can be a sum of $v_{pc\_sm}$ and $v_{pc\_vsc}$, as can be understood.

A negative, ground, or lower DC node can connect to a lower side of the lower multiphase line frequency commutated VSC 106. The lower multiphase line frequency commutated VSC 106 can include a single VSC capacitor $C_{VSC}$, connected in parallel with a number of half-bridge circuits corresponding to the number of phases of the MMC 100, in this case three half-bridge circuits. The voltage $v_{na\_vsc}$ can refer to a voltage from the lower DC node to a midpoint of each half-bridge circuit of the lower multiphase line frequency commutated VSC 106. The lower sides of the lower switches of the three branch half-bridge circuits of the lower multiphase line frequency commutated VSC 106 can be connected to the lower DC node of the MMC 100. The upper sides of the upper switches of each of the three branch half-bridge circuits of the lower multiphase line frequency commutated VSC 106 can be connected to each other.

In some cases, a capacitor bank of parallel capacitors can be provided rather than a single capacitor single VSC capacitor $C_{VSC}$. The VSC capacitor of the lower arms of the MMC 100 can also be referred to as a lower VSC capacitor $C_{VSCL}$. Each of the switches used in the lower multiphase line frequency commutated VSC 106 can include one or more insulated-gate bipolar transistors (IGBTs) and can be referred to as an IGBT stack. The switch or stack of switching devices used in the lower multiphase line frequency commutated VSC 106 can have a higher voltage rating and lower chopping speed with respect to the switching devices in each submodule of the lower series submodule chain links 112a, 112b, and 112c.

In each branch corresponding to a phase of the MMC 100, the midpoint of each half-bridge circuit of the lower multiphase line frequency commutated VSC 106 can be connected in series with a lower series submodule chain link 112, such as the branch series submodule chain link 112a, the branch series submodule chain link 112b, and the branch series submodule chain link 112c. Each branch series submodule chain link 112a, 112b, and 112c can include a number of submodules. While three are shown, there can be any number of half-bridge submodules in a series submodule chain link 112. Each of the half-bridge submodules can include a DC capacitor submodule capacitor $C_{SM}$ connected across the half-bridge circuit.

A voltage across the branch series submodule chain link 112a for branch A can be $v_{na\_sm}$. An arm voltage $v_{na}$ for the lower arm of branch A can be a sum of $v_{na\_sm}$ and $v_{na\_vsc}$. A voltage across the branch series submodule chain link 112b for branch B can be $v_{nb\_sm}$. While not shown, the arm voltage $v_{nb}$ for branch B can be a sum of $v_{nb\_sm}$ and $v_{nb\_vsc}$. A voltage across the branch series submodule chain link 112c for branch C can be $v_{nc\_sm}$. While not shown, the arm voltage $v_{nc}$ for branch C can be a sum of $v_{nc\_sm}$ and $v_{nc\_vsc}$, as can be understood.

Arm current $i_{pa}$ can be a current through the positive or upper arm of branch A. This current can be detected or identified as current through any of the series upper arm elements including an arm inductor, the series submodule chain link 109a and the upper multiphase line frequency commutated VSC 103. Arm current $i_{pb}$ can be a current through the positive or upper arm of branch B. This current can be detected or identified as current through any of the series upper arm elements including an arm inductor, the series submodule chain link 109b and the upper multiphase line frequency commutated VSC 103. Arm current $i_{pc}$ can be a current through the positive or upper arm of branch C. This current can be detected or identified as current through any of the series upper arm elements including an arm inductor, the series submodule chain link 109c and the upper multiphase line frequency commutated VSC 103.

Arm current $i_{na}$ can be a current through the negative or lower arm of branch A. This current can be detected or identified as current through any of the series lower arm elements including an arm inductor, the series submodule chain link 112a and the lower multiphase line frequency commutated VSC 106. Arm current $i_{nb}$ can be a current through the negative or lower arm of branch B. This current can be detected or identified as current through any of the series lower arm elements including an arm inductor, the series submodule chain link 112b and the lower multiphase line frequency commutated VSC 106. Arm current $i_{nc}$ can be a current through the negative or lower arm of branch C. This current can be detected or identified as a current through any of the series lower arm elements including an arm inductor, the series submodule chain link 112c and the lower multiphase line frequency commutated VSC 106.

The MMC 100 can include and be controlled using a line frequency commutating controller 115. The line frequency commutating controller 115 and associated sensors can monitor operational parameters the components of the MMC 100. The line frequency commutating controller 115 can use the detected parameters to calculate upper and lower arm reference voltages for each branch of the MMC 100. The arm reference voltage can be compared to VSC capacitor voltage in that arm (e.g., upper or lower VSC capacitor voltage) in order to determine whether to insert or bypass the VSC capacitor. This process can automatically provide arm energy balancing that causes a positive area under an arm current curve to be equal to a negative area under the arm current curve when the VSC capacitor is inserted. Since the line frequency commutating controller 115 uses operational principles that perform energy balancing it can also be referred to as an energy balancing controller. The line frequency commutating controller 115 circuit can generate and transmit or apply VSC switch control signals that insert or bypass the VSC capacitor. The line frequency commutating controller 115 circuit can generate and transmit or apply submodule switch control signals for each submodule. Generally, the line frequency commutating controller 115 control the MMC 100 to provide AC-to-DC and DC-to-AC conversions in the various embodiments. The branch AC currents of the MMC 100 can be $i_a$, $i_b$, and $i_c$. The branch AC voltages of the MMC 100 can be $v_a$, $v_b$, and $v_c$.

Figure 1B:
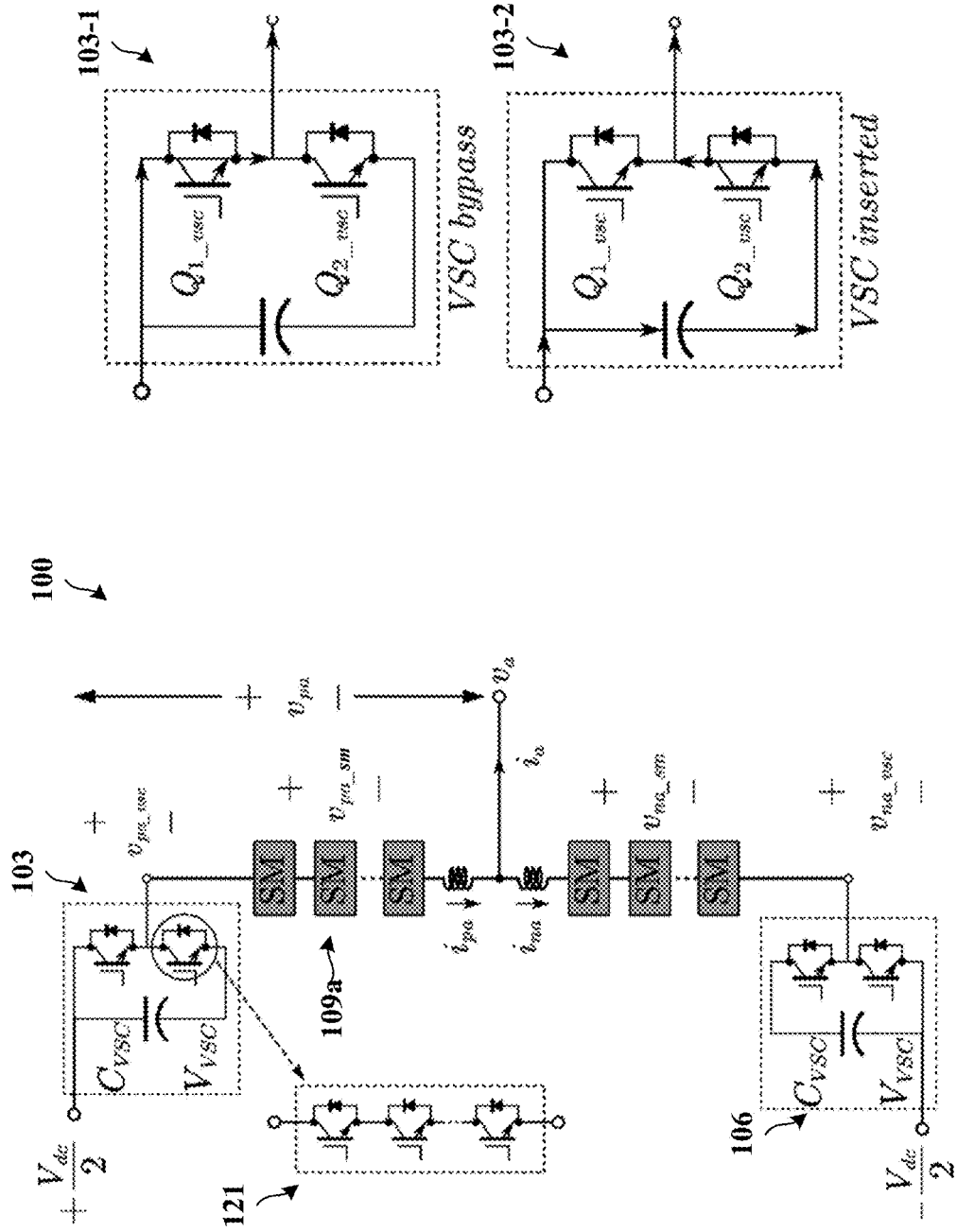
FIG. 1B illustrates an example of a single phase of the modular multilevel converter shown in FIG. 1A according to embodiments of the present disclosure.

FIG. 1B shows a single phase or branch of the MMC 100 along with individual phases of the multiphase line frequency commutated VSCs 103 and 106. The figure also shows two operational states of the upper multiphase line frequency commutated VSC 103 for illustrative purposes. The principles of operation that are discussed with respect to the single phase shown in FIG. 1B can be extended to full multiphase operation and control, as can be understood. For example, while branch A is described, the principles are applicable to other branches.

Each arm, including the upper arm and the lower arm of the single phase of the MMC 100 can include a high voltage VSC, a series submodules (SMs) based chain-link and an arm inductor. For example, the upper arm of the single phase of the MMC 100 can include the upper multiphase line frequency commutated VSC 103 in series with the series submodule chain link 109a and an upper arm inductor. The upper multiphase line frequency commutated VSC 103, the series submodule chain link 109a, and the upper arm inductor can be in series between an upper DC node and a "branch A" AC node. The upper DC node can span all branches of the MMC 100 and can have a voltage of $V_{dc}/2$.

The upper multiphase line frequency commutated VSC 103 can be considered a high voltage VSC. For example, a voltage rating of the switching devices of the upper multiphase line frequency commutated VSC 103 can be greater or higher than a voltage rating of switching devices of the series submodule chain link 109a, and a voltage across the VSC capacitor $C_{VSC}$ can be greater or higher than a single submodule capacitor of a single submodule of the series submodule chain link 109a.

While a single switch is shown for each switching device of the half-bridge circuit of the upper multiphase line frequency commutated VSC 103, each switch shown includes an IGBT, metal oxide field effect transistor (MOSFET), or other kind of switching device stack 121 or series stack of switching devices. The switches of the lower multiphase line frequency commutated VSC 106 can also include a switching device stack.

There can be two working states for the high voltage upper multiphase line frequency commutated VSC 103. For example, the high voltage upper multiphase line frequency commutated VSC 103-1 shows a current path when $Q_{1\_vsc}$ is turned on (closed) and $Q_{2\_vsc}$ is turned off (open). This current path shows that the VSC capacitor $C_{VSC}$ is bypassed. In other words, when $Q_{1\_vsc}$ is turned on, the high voltage upper multiphase line frequency commutated VSC 103 is "bypassed," or in bypass mode.

By contrast, the high voltage upper multiphase line frequency commutated VSC 103-2 shows a current path when $Q_{2\_vsc}$ is turned on and $Q_{1\_vsc}$ is turned off. This current path shows that the VSC capacitor $C_{VSC}$ is inserted in series with the series submodule chain link 109a and the arm inductor. In other words, when $Q_{2\_vsc}$ is turned on, the high voltage upper multiphase line frequency commutated VSC 103 is "inserted," or in insert mode. The line frequency commutating controller 115 can provide VSC control signals to the switches $Q_{1\_vsc}$ and $Q_{2\_vsc}$ to bypass and insert the VSC capacitor $C_{VSC}$. The switches $Q_{1\_vsc}$ and $Q_{2\_vsc}$ correspond to a particular branch of the upper multiphase line frequency commutated VSC 103. Put another way, the switches $Q_{1\_vsc}$ and $Q_{2\_vsc}$ correspond to an upper arm of the particular branch or phase of the MMC 100. Insert mode and bypass mode can be considered switching modes or operational modes of a VSC half-bridge circuit 104 comprising the switches $Q_{1\_vsc}$ and $Q_{2\_vsc}$.

Figure 2:
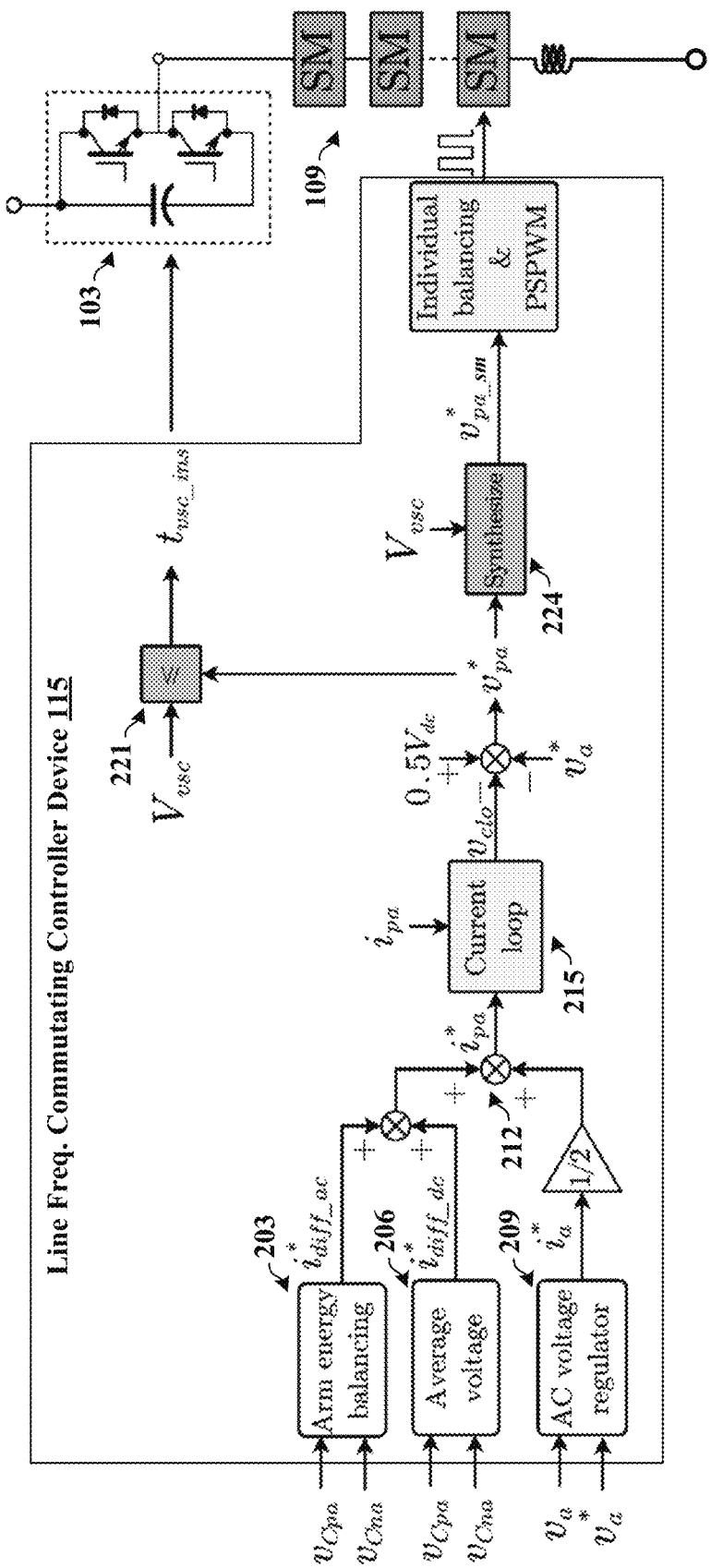
FIG. 2 illustrates an example of a line frequency commutating controller for modular multilevel converters and hybrid modular multilevel converters with multiphase voltage source converters according to embodiments of the present disclosure.

FIG. 2 illustrates an example of a line frequency commutating controller 115 for MMCs and HMMCs with multiphase voltage source converters. This can include the MMC 100 of FIGS. 1A and 1B, as well as the HMMCs of FIGS. 7 and 8.

The line frequency commutating controller 115 can detect or receive $v_{Cpa}$, $v_{Cna}$, and $v_a$, using corresponding voltage sensor devices. The voltage $v_{Cpa}$ can refer to actual or detected chain link (CL) capacitor voltage for the positive or upper arm of branch A. The voltage $v_{Cna}$ can refer to actual or detected CL capacitor voltage for the negative or lower arm of branch A. The voltages $v_{Cpa}$ and $v_{Cna}$ can The voltage $v_a$ can be actual AC voltage for branch A. The voltage $v_a$* can be calculated or reference AC voltage for branch A. The voltage $v_{Cpa}$ can refer to the sum of total DC-link capacitor voltages of capacitors of a series of half-bridge submodules in an arm of a branch of the line frequency commutating controller 115. The voltage $v_{Cpa}$ can be related to an output voltage across the series submodule chain link 109a for the upper arm of branch A can be $v_{pa\_sm}$. The relationship can be similar to the relationship between $V_{VSC}$ and $v_{pa\_vsc}$, where $V_{VSC}$ is the voltage of the VSC capacitor or VSC capacitors of the VSC, and voltage $v_{pa\_vsc}$ is an voltage difference between the upper DC node and the upper VSC node in the middle of the two switching devices of the upper VSC half-bridge circuit.

An arm energy balancing component 203 can take $v_{Cpa}$ and $v_{Cna}$ as inputs to calculate the AC component of circulating current reference $i_{diff\_ac}*$. A voltage averaging component 206 can take $v_{Cpa}$ and $v_{Cna}$ as inputs to calculate the DC component of circulating current reference $i_{diff\_dc}*$. An AC voltage regulator component 209 can take $v_a$ and $v_a*$ as inputs to calculate AC current $i_a*$. The current $i_{diff\_ac}*$ can be mixed or multiplied with $i_{diff\_dc}*$, and the mixed output current can be mixed with half or a fraction of AC current $i_a*$ to calculate $i_{pa}*$. A current loop component 215 can take calculated and/or reference $i_{pa}*$ and measured $i_{pa}$ to determine current loop voltage $v_{clo}$, which is the voltage across the arm inductor for the arm and branch. The current loop voltage $v_{clo}$ can also be called the calculated arm inductor voltage. The current loop voltage $v_{clo}$ can be calculated in the close-loop control of the current loop component 215 to adjust the arm voltage, so that the arm current $i_{pa}$ can track the reference $i_{pa}*$. Compared to the feed-forward calculation $0.5 V_{dc} - v_a*$, $v_{clo}$ can be comparatively smaller. In some cases, vpa* can be calculated or estimated as $0.5 V_{dc} - v_a*$. The voltage $v_a*$ can be a command from the higher level control. In the example of a motor drive application, it can come from speed and torque control. In the example of a grid connected application, it can refer to the AC grid voltage directly. The line frequency commutating controller 115 can subtract $v_a*$ from $0.5 V_{dc}$ to calculate or determine $v_{pa}*$ as $0.5 V_{dc} - v_a*$.

The line frequency commutating controller 115 can utilize the detected values and calculated values referred to above to calculate $v_a*$ and ultimately $v_{pa}*$. The line frequency commutating controller 115 can utilize $v_{pa}*$ as a control parameter to generate VSC switching signals that control the VSC insertion time $t_{vsc\_ins}$, for a portion of the VSC 103 corresponding to that branch. The line frequency commutating controller 115 can also perform individual balancing and phase shift pulse width modulation for individual submodules of a series submodule chain link 109.

The line frequency commutating controller 115 can include a synthesizing component 224 that synthesizes $v_{pa\_sm}*$ using $v_{pa}*$ and $V_{VSC}$ as inputs, and can perform individual balancing and phase shift pulse width modulation for individual submodules of a series submodule chain link 109 based on the synthesized $v_{pa\_sm}*$ value.

The line frequency commutating controller 115 can calculate the reference upper arm voltage $v_{pa}*$, the lower reference arm voltage $v_{na}*$, as well as the reference upper arm current $i_{pa}*$ and the reference lower arm current $i_{na}*$ according to equation set (1).

$$\begin{cases} v_{pa}^* = 0.5 V_{dc} - v_a^* - v_{clo\_pa} \\ v_{na}^* = 0.5 V_{dc} + v_a^* - v_{clo\_na} \end{cases}, \begin{cases} i_{pa}^* = I_{dc} - 0.5 i_a^* \\ i_{na}^* = I_{dc} - 0.5 i_a^* \end{cases} \quad (1)$$

Calculated or reference arm voltage $v_{pa}*$ can be a sum of VSC voltage $v_{pa\_vsc}*$ and chain-link or submodule voltage $v_{pa\_sm}*$, as shown in equation (2).

$$v_{pa}^* = v_{pa\_vsc}^* + v_{pa\_sm}^* \quad (2)$$

These voltages can be calculated or reference voltages for the calculation. The VSC voltage $v_{pa\_vsc}*$ can be a voltage difference between the upper DC node and the upper VSC node in the middle of the two switching devices of the upper VSC half-bridge circuit. The value of VSC voltage $v_{pa\_vsc}*$ can be the same as VSC capacitor voltage $V_{VSC}$ when the VSC capacitor is inserted, and can be zero when the VSC capacitor is bypassed, since the path between the upper DC node and the upper VSC node is routed through a switch.

The line frequency commutating controller 115 can generate VSC switching signals that control the VSC insertion time $t_{vsc\_ins}$ using the control rules or operating principle described by equation set (3).

$$\begin{cases} v_{pa\_sm}^* = v_{pa}^*, & v_{pa}^* < V_{vsc}, \text{VSC bypassed} \\ v_{pa\_sm}^* = v_{pa}^* - V_{vsc}, & v_{pa}^* \geq V_{vsc}, \text{VSC inserted} \end{cases} \quad (3)$$

In other words, when calculated or reference arm voltage $v_{pa}*$ is less than VSC capacitor voltage $V_{VSC}$, the VSC capacitor is bypassed and $v_{pa\_sm}*$ is equal to $v_{pa}*$. However, when $v_{pa}*$ is greater than or equal to VSC capacitor voltage $V_{VSC}$, the VSC capacitor is inserted and $v_{pa\_sm}*$ is $v_{pa}*$ minus $V_{VSC}$. VSC capacitor voltage $V_{VSC}$ can be considered as a constant for the purpose of this calculation. The line frequency commutating controller 115 can include a comparator circuit or component 221 that compares the calculated $v_{pa}*$ value to the capacitor voltage $V_{VSC}$.

Figure 3:
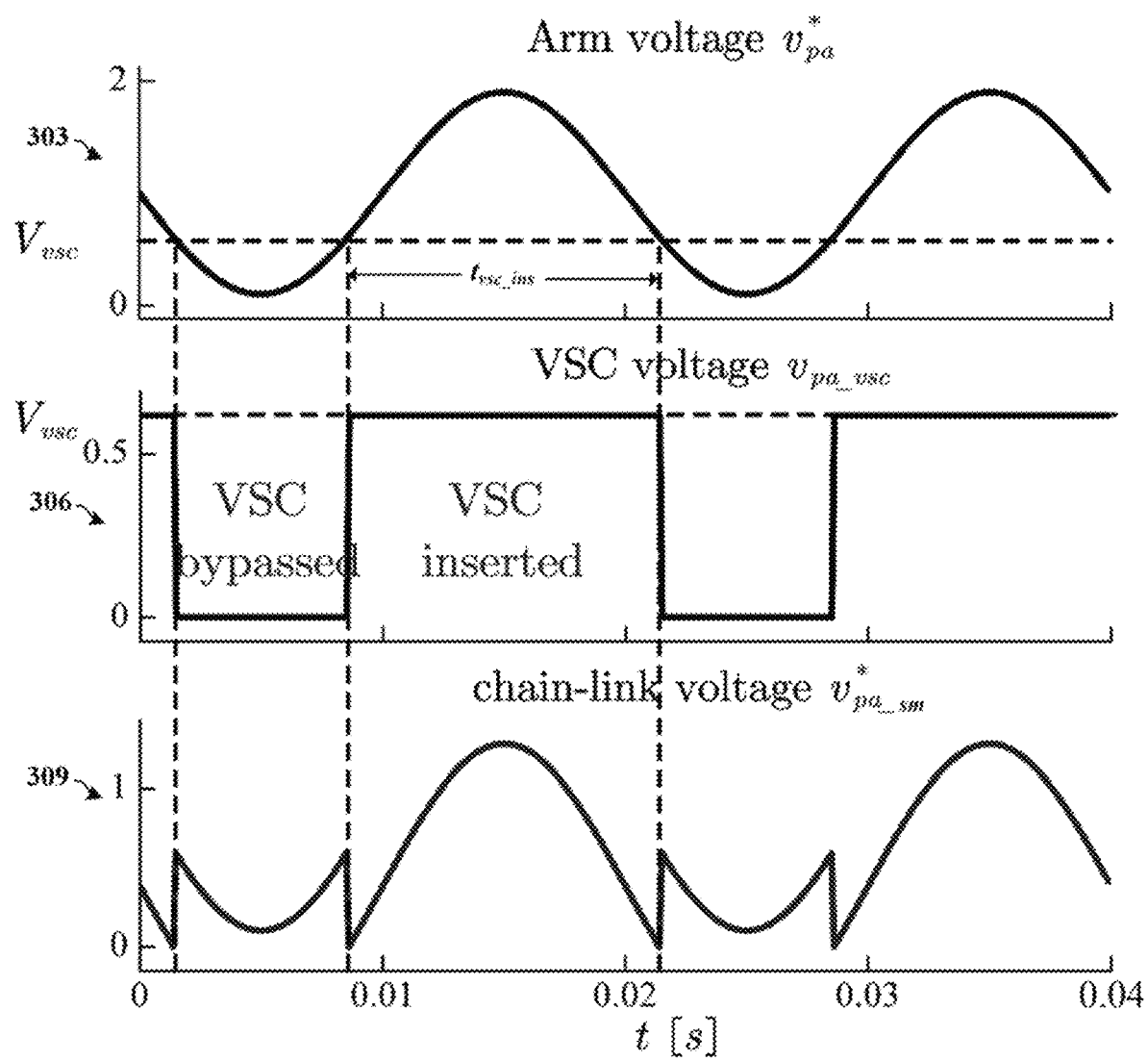
FIG. 3 illustrates example voltage graphs of an upper arm of the modular multilevel converter with multiphase line frequency commutated voltage source converter of FIG. 1A according to embodiments of the present disclosure.

FIG. 3 illustrates an example of voltage graphs 303, 306, and 309 corresponding to the upper arm of the modular multilevel converter 100. An example of the arm voltage $v_{pa}$ or $v_{pa}*$ is shown in graph 303. An example of the VSC voltage $v_{pa\_vsc}*$ is shown in graph 306. An example of the chain-link or submodule voltage $v_{pa\_sm}*$ is shown by graph 309. The value of VSC voltage $v_{pa\_vsc}*$ can be the same as VSC capacitor voltage $V_{VSC}$ when the VSC capacitor is inserted and can be zero when the VSC capacitor is bypassed.

The line frequency commutating controller 115 can measure, detect, or otherwise check a voltage value for $V_{VSC}$. The line frequency commutating controller 115 can also continuously calculate $v_{pa}*$ as described with respect to FIG. 2. When $v_{pa}*$ is greater than or equal to VSC capacitor voltage $V_{VSC}$, the line frequency commutating controller 115 can generate VSC switching control signals that insert the VSC capacitor. In graph 309, when the VSC is inserted it can be seen that $v_{pa}*$ is $v_{pa}*$ decreased by $V_{VSC}$.

On the other hand, when calculated or reference arm voltage $v_{pa}*$ is less than VSC capacitor voltage $V_{VSC}$, the line frequency commutating controller 115 can generate VSC switching control signals that bypasses the VSC capacitor. In graph 309, when the VSC is bypassed it can be seen that $v_{pa\_sm}*$ is the same as $v_{pa}*$. It can be seen that the VSC is line-frequency commutated, and the voltage level is maintained even with a lower number of submodules.

Figure 4:
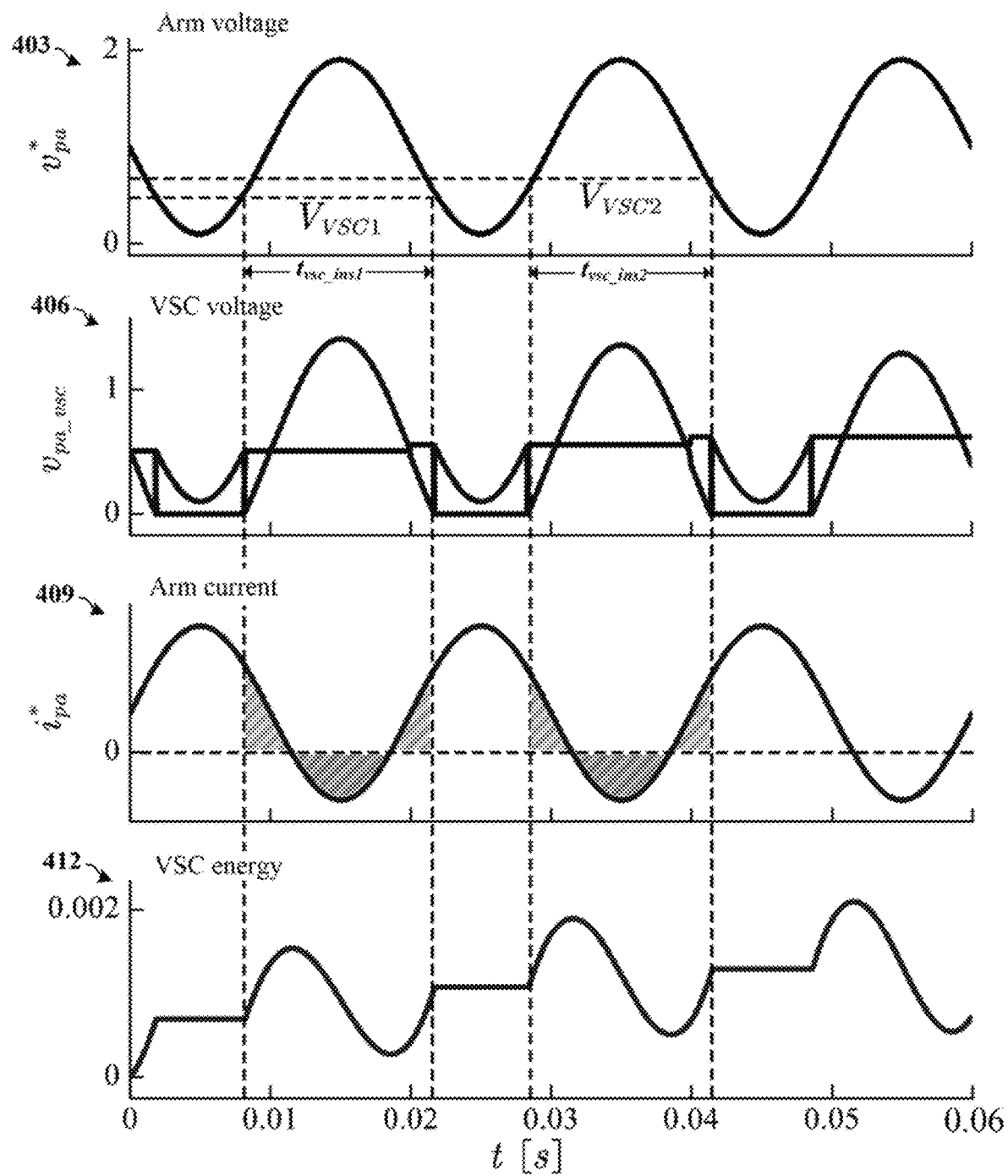
FIG. 4 illustrates an example of voltage, current and energy graphs of the modular multilevel converter shown in FIG. 1A according to embodiments of the present disclosure.

FIG. 4 illustrates an example of voltage, current and energy graphs of the modular multilevel converter 100. The graphs include an arm voltage graph 403, a VSC voltage graph 406, an arm current graph 409, and a VSC energy graph 412. The example of FIG. 4 shows the self-regulating energy balancing action of the line frequency commutating controller 115 and the MMC 100 with multiphase line frequency commutated voltage source converters 103 and 106.

The arm voltage graph 403 graph shows that VSC capacitor voltage can change or charge to higher levels over time. For example, an initial VSC capacitor voltage $V_{VSC1}$ can be used for a first switching cycle. The line frequency commutating controller 115 can control the VSC insertion time $t_{vsc\_ins1}$ using the control rules or operating principles described by equation set (3). This enables the line frequency commutating controller 115 to balance the positive (e.g., above zero) areas and negative (e.g., below zero) area under the arm current curve in the arm current graph 409.

The VSC capacitor can charge to an increased voltage level or discharge to a decreased voltage level to a balance point, increasing the VSC capacitor voltage from $V_{VSC1}$ to $V_{VSC2}$ and ultimately to a balanced VSC capacitor voltage $V_{VSC\_bal}$. As this process proceeds, the line frequency commutating controller 115 can detect that the VSC capacitor voltage is increased to $V_{VSC2}$, and can utilize this new value control the VSC insertion time $t_{vsc\_ins2}$ using the operating principles described by equation set (3). As can be seen, the higher VSC capacitor voltage $V_{VSC2}$ causes the VSC insertion time $t_{vsc\_ins2}$ to be decreased. The VSC capacitor voltage can be inversely related to the VSC insertion time when using the operating principles described by equation set (3).

The VSC voltage can be closely related to the arm current polarity during VSC insertion time. When arm current $i_{pa}$* is positive, (corresponding to the upper areas under the arm current graph 409), the VSC capacitor is charging and energy is increasing as shown in the VSC energy graph 412. When $i_{pa}$* is negative, (corresponding to the lower area under the arm current graph 409), the VSC capacitor is discharging and energy is decreasing. VSC voltage is balanced if the upper areas are equal to the lower area. The line frequency commutating controller 115 can control the VSC insertion time using the operating principles described by equation set (3) in order to balance the VSC voltage as well as balance the upper areas to the lower area under the arm current graph 409. A particular insertion time $t_{vsc\_ins\_bal}$, corresponds to the balanced VSC capacitor voltage $V_{VSC\_bal}$ to achieve balance. As shown in equation (4), a balanced insertion time $t_{vsc\_ins\_bal}$ can be symmetrical with the center of $3T_o/4$, and $i_{pa}$* can be fixed at a working condition.

$$\int_{\frac{3}{4}T_o-t_{vsc\_ins\_bal}}^{\frac{3}{4}T_o+t_{vsc\_ins\_bal}} i_{pa} \cdot dt = 0 \quad (4)$$

The line frequency commutating controller 115 can identify and control the circuit to have a balanced insertion time using VSC capacitor voltage to identify VSC switching times according to equation set (3). If the initial VSC voltage $V_{VSC1}$ is lower than this value $V_{vsc\_bal}$ as shown in the first cycle of FIG. 4, then insertion time can be longer than the desired working point. In some cases, this can cause a temporary imbalance such that the total of the upper areas is larger than the lower area.

The VSC capacitor voltage can be charged from $V_{vsc1}$ to $V_{vsc2}$ over this cycle. If $V_{vsc2}$ is still lower than $V_{vsc\_bal}$, the same charging effect will be applied. As can be understood, a similar process can occur if the VSC capacitor voltage is too high, or if the balancing process overshoots $V_{vsc\_bal}$. However, if $V_{vsc1}$ or $V_{vsc2}$ are the same as $V_{vsc\_bal}$, then the circuit will operate at a steady state. While there can be imbalanced energy or imbalanced positive and negative areas under the arm current curve at imbalanced $V_{VSC}$ values, positive and negative areas under the arm current curve will be balanced or equivalent at the stated state operation at $V_{vsc\_bal}$. The operating principles described with respect to FIG. 2 cause the line frequency commutating controller 115 to automatically reduce imbalances over each cycle, ultimately reaching a balanced working condition. The line frequency commutating controller 115 can implement proportional-integral (PI) controller functionality or PI components to accelerate the balancing procedure.

Figure 5:
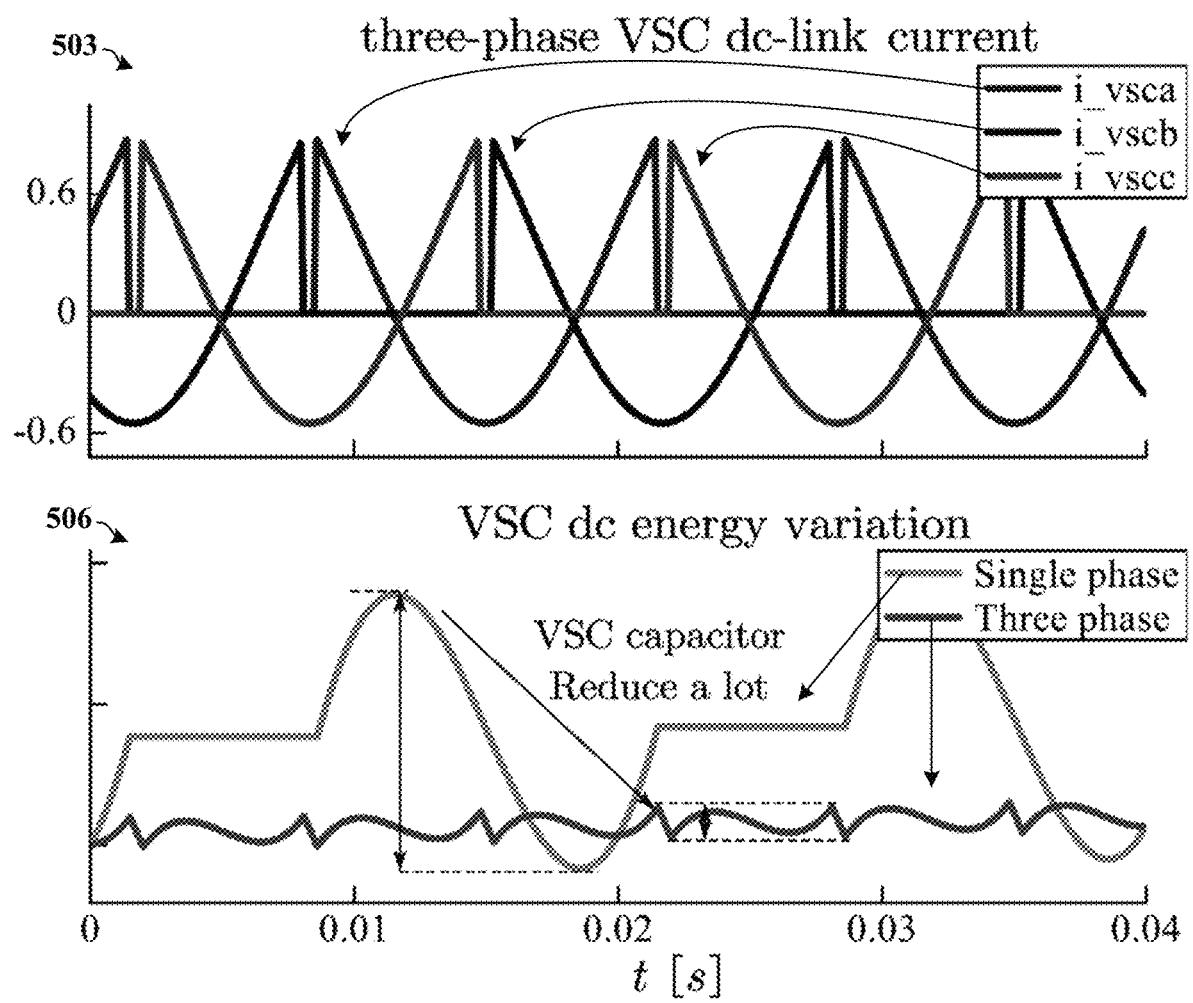
FIG. 5 illustrates an example of voltage source converter capacitor current and ripple cancellation of the modular multilevel converter shown in FIG. 1A according to embodiments of the present disclosure.

FIG. 5 illustrates an example of voltage source converter capacitor current and ripple cancellation of the modular multilevel converter with multiphase line frequency commutated voltage source converter of FIG. 1A, according to embodiments of the present disclosure. FIG. 5 shows a three-phase VSC DC-link current graph 503, and a VSC DC energy variation graph 506 for single phase and three phase implementations. As can be seen in the VSC DC energy variation graph 506, the capacitor ripple can be reduced by three phase cancellation. For example, the difference between maximum VSC energy and minimum VSC energy can be reduced. However, the VSC can operate in line-frequency, and the ripple is not totally eliminated. Using the principles described herein, approximately 30% capacitor size can be saved compared to conventional MMC.

Figure 6:
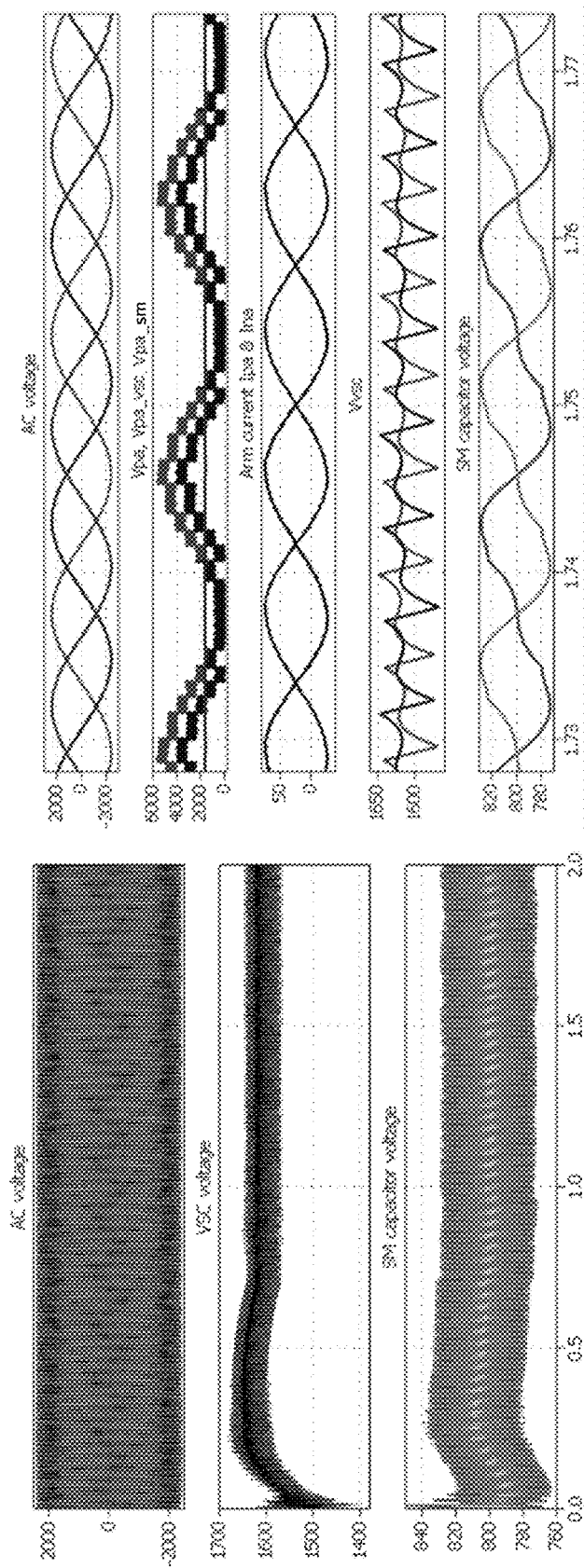
FIG. 6 illustrates an example of self-regulating operation of the modular multilevel converter shown in FIG. 1A according to embodiments of the present disclosure.

FIG. 6 illustrates an example of the self-regulating operation of the modular multilevel converter with multiphase line frequency commutated voltage source converter of FIG. 1A, according to embodiments of the present disclosure.

TABLE I

| Parameters | Symbol | Value | | Parameters | Symbol | Value | |
|---|---|---|---|---|---|---|---|
| Rated Power | P | 360 | kW | SM voltage | $V_{sm}$ | 800 | kV |
| DC bus voltage | $V_{dc}$ | 5 | kV | SM switching freq. | $f_s$ | 12 | kHz |
| AC voltage amplitude | $V_{ac}$ | 2.4 | kV | Arm inductance | $L_m$ | 3 | mH |
| No. of SM per arm | N | 5 | | VSC cap. voltage | $V_{VSC}$ | 1.5 | kV |
| SM capacitance | $C_{sm}$ | 1.3 | mF | VSC capacitance | $C_{VSC}$ | 0.2 | mF |

Using the parameters that are listed in Table I, the waveforms of FIG. 6 can be obtained. It can be observed that VSC capacitor initial voltage can be 1.5 kV in this example, but the balanced condition $V_{vsc\_bal}$ can be 1620 V.

Figure 7:
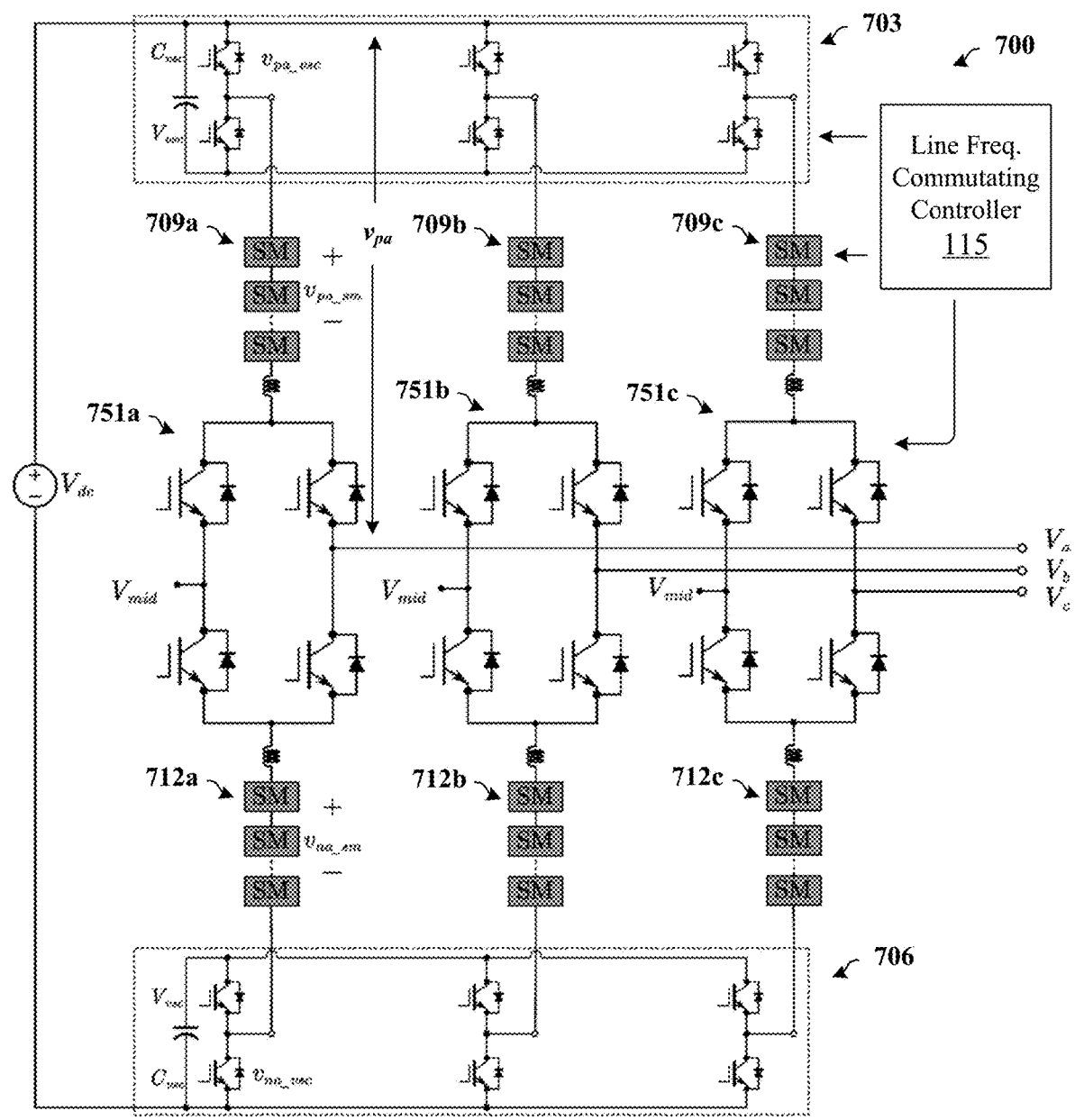
FIG. 7 illustrates an example of a multiphase hybrid modular multilevel converter with multiphase line frequency commutated voltage source converters according to embodiments of the present disclosure.

FIG. 7 shows an HMMC 700 that includes an upper multiphase line frequency commutated VSC 703 and a lower multiphase line frequency commutated VSC 706. In some cases, the upper multiphase line frequency commutated VSC 703 and the lower multiphase line frequency commutated VSC 706 can be considered upper and lower components of a single VSC. The HMMC 700 can operate in a manner analogous to the MMC 100, except that the HMMC 700 includes full-bridge rectifiers 751a, 751b, and 751c that connect the arms of the branch to the corresponding AC-side node and $V_{mid}$.

The HMMC 700 can include a number of branches for multiphase or polyphase operation, such as three branches for the three phase operation as shown. However, any number of phases, such as one phase, two phase, three phase, four phase, five phase, and so on can be used. The HMMC 700 can be capable of AC-to-DC and DC-to-AC conversions in the various embodiments. The HMMC 700 can take (or generate) a voltage $V_{dc}$ across upper and lower DC nodes.

A positive or upper DC node can connect to an upper side of the upper multiphase line frequency commutated VSC 703. The upper multiphase line frequency commutated VSC 703 can include a single VSC capacitor $C_{VSC}$, connected in parallel with a number of half-bridge circuits corresponding to the number of phases of the HMMC 700, in this case three half-bridge circuits. The voltage $v_{pa\_vsc}$ can refer to a voltage from the upper DC node to a midpoint of the half-bridge circuit of the upper multiphase line frequency commutated VSC 703. Each branch can include its own $v_{pa\_vsc}$ value. The upper sides of the upper switches of the three branch half-bridge circuits of the upper multiphase line frequency commutated VSC 703 can be connected to the upper DC node of the HMMC 700. The lower sides of the lower switches of each of the three branch half-bridge circuits of the upper multiphase line frequency commutated VSC 703 can be connected to each other.

In some cases, a capacitor bank of parallel capacitors can be provided rather than a single capacitor single VSC capacitor $C_{VSC}$. The VSC capacitor of the upper arms of the HMMC 700 can also be referred to as an upper VSC capacitor $C_{VSCU}$. Each of the switches used in the upper multiphase line frequency commutated VSC 703 can include one or more insulated-gate bipolar transistors (IGBTs) and can be referred to as an IGBT stack. The switch or stack of switching devices used in the upper multiphase line frequency commutated VSC 703 can have a higher voltage rating and lower chopping speed with respect to the switching devices in each submodule of the upper series submodule chain links 709a, 709b, and 709c.

In each branch corresponding to a phase of the HMMC 700, the midpoint of each half-bridge circuit of the upper multiphase line frequency commutated VSC 703 can be connected in series with an upper series submodule chain link 709, such as the branch series submodule chain link 709a, the branch series submodule chain link 709b, and the branch series submodule chain link 709c. Each branch series submodule chain link 709a, 709b, and 709c can include a number of submodules. While three are shown, there can be any number of half-bridge submodules in a series submodule chain link 709. Each of the half-bridge submodules can include a DC capacitor submodule capacitor $C_{SM}$ connected across the half-bridge circuit.

A voltage across the branch series submodule chain link 709a for branch A can be $v_{pa\_sm}$. An arm voltage $v_{pa}$ for the upper arm of branch A can be a sum of $v_{pa\_sm}$ and $v_{pa\_vsc}$. A voltage across the branch series submodule chain link 709b for branch B can be $v_{pb\_sm}$. While not shown, the arm voltage $v_{pb}$ for branch B can be a sum of $v_{pb\_sm}$ and $v_{pb\_vsc}$. A voltage across the branch series submodule chain link 709c for branch C can be $v_{pc\_sm}$. While not shown, the arm voltage $v_p c$ for branch C can be a sum of $v_{pc\_sm}$ and $v_{pc\_vsc}$, as can be understood.

A negative, ground, or lower DC node can connect to a lower side of the lower multiphase line frequency commutated VSC 706. The lower multiphase line frequency commutated VSC 706 can include a single VSC capacitor $C_{VSC}$, connected in parallel with a number of half-bridge circuits corresponding to the number of phases of the HMMC 700, in this case three half-bridge circuits. The voltage $v_{na\_vsc}$ can refer to a voltage from the lower DC node to a midpoint of each half-bridge circuit of the lower multiphase line frequency commutated VSC 706. The lower sides of the lower switches of the three branch half-bridge circuits of the lower multiphase line frequency commutated VSC 706 can be connected to the lower DC node of the HMMC 700. The upper sides of the upper switches of each of the three branch half-bridge circuits of the lower multiphase line frequency commutated VSC 706 can be connected to each other.

In some cases, a capacitor bank of parallel capacitors can be provided rather than a single capacitor single VSC capacitor $C_{VSC}$. The VSC capacitor of the upper arms of the HMMC 700 can also be referred to as a lower VSC capacitor $C_{VSCL}$. Each of the switches used in the lower multiphase line frequency commutated VSC 706 can include one or more insulated-gate bipolar transistors (IGBTs) and can be referred to as an IGBT stack. The switch or stack of switching devices used in the lower multiphase line frequency commutated VSC 706 can have a higher voltage rating and lower chopping speed with respect to the switching devices in each submodule of the lower series submodule chain links 712a, 712b, and 712c.

In each branch corresponding to a phase of the HMMC 700, the midpoint of each half-bridge circuit of the lower multiphase line frequency commutated VSC 706 can be connected in series with a lower series submodule chain link 712, such as the branch series submodule chain link 712a, the branch series submodule chain link 712b, and the branch series submodule chain link 712c. Each branch series submodule chain link 712a, 712b, and 712c can include a number of submodules. While three are shown, there can be any number of half-bridge submodules in a series submodule chain link 712. Each of the half-bridge submodules can include a DC capacitor submodule capacitor $C_{SM}$ connected across the half-bridge circuit.

A voltage across the branch series submodule chain link 712a for branch A can be $v_{na\_sm}$. An arm voltage $v_{na}$ for the lower arm of branch A can be a sum of $v_{na\_sm}$ and $v_{na\_vsc}$. A voltage across the branch series submodule chain link 712b for branch B can be $v_{nb\_sm}$. While not shown, the arm voltage $v_{nb}$ for branch B can be a sum of $v_{nb\_sm}$ and $v_{nb\_vsc}$. A voltage across the branch series submodule chain link 712c for branch C can be $v_{nc\_sm}$. While not shown, the arm voltage $v_{nc}$ for branch C can be a sum of $v_{nc\_sm}$ and $v_{nc\_vsc}$, as can be understood.

Arm current $i_{pa}$ can be a current through the positive or upper arm of branch A. This current can be detected or identified as current through any of the series upper arm elements including an arm inductor, the series submodule chain link 709a and the upper multiphase line frequency commutated VSC 703. Arm current $i_{pb}$ can be a current through the positive or upper arm of branch B. This current can be detected or identified as current through any of the series upper arm elements including an arm inductor, the series submodule chain link 709b and the upper multiphase line frequency commutated VSC 703. Arm current $i_{pc}$ can be a current through the positive or upper arm of branch C. This current can be detected or identified as current through any of the series upper arm elements including an arm inductor, the series submodule chain link 709c and the upper multiphase line frequency commutated VSC 703.

Arm current $i_{na}$ can be a current through the negative or lower arm of branch A. This current can be detected or identified as current through any of the series lower arm elements including an arm inductor, the series submodule chain link 712a and the lower multiphase line frequency commutated VSC 706. Arm current $i_{nb}$ can be a current through the negative or lower arm of branch B. This current can be detected or identified as current through any of the series lower arm elements including an arm inductor, the series submodule chain link 712b and the lower multiphase line frequency commutated VSC 706. Arm current $i_{nc}$ can be a current through the negative or lower arm of branch C. This current can be detected or identified as current through any of the series lower arm elements including an arm inductor, the series submodule chain link 712c and the lower multiphase line frequency commutated VSC 706.

The HMMC 700 can include or be controlled using a line frequency commutating controller 115. The line frequency commutating controller 115 can operate using the operating principles described above. The line frequency commutating controller 115 can also generate and provide full-bridge control signals for each branch of the HMMC 700. The line frequency commutating controller 115 circuit and associated sensors can monitor operational parameters of all of the components of the HMMC 700. The line frequency commutating controller 115 can use the detected parameters to calculate upper and lower arm voltages for each branch of the HMMC 700. The arm voltage can be compared to VSC capacitor voltage in that arm (e.g., upper or lower VSC capacitor voltage) in order to determine whether to insert or bypass the VSC capacitor. This process can automatically provide arm energy balancing that causes a positive area under an arm current curve to be equal to a negative area under the arm current curve when the VSC capacitor is inserted. The line frequency commutating controller 115 circuit can generate and transmit or apply VSC switch control signals that insert or bypass the VSC capacitor. The line frequency commutating controller 115 circuit can generate and transmit or apply submodule switch control signals for each submodule. Generally, the line frequency commutating controller 115 can control the HMMC 700 to provide AC-to-DC and DC-to-AC conversions in the various embodiments. The branch AC currents of the HMMC 700 can be $i_a$, $i_b$, and $i_c$. The branch AC voltages of the HMMC 700 can be $v_a$, $v_b$, and $v_c$ which can be taken as inputs or generated among the various embodiments.

Figure 8:
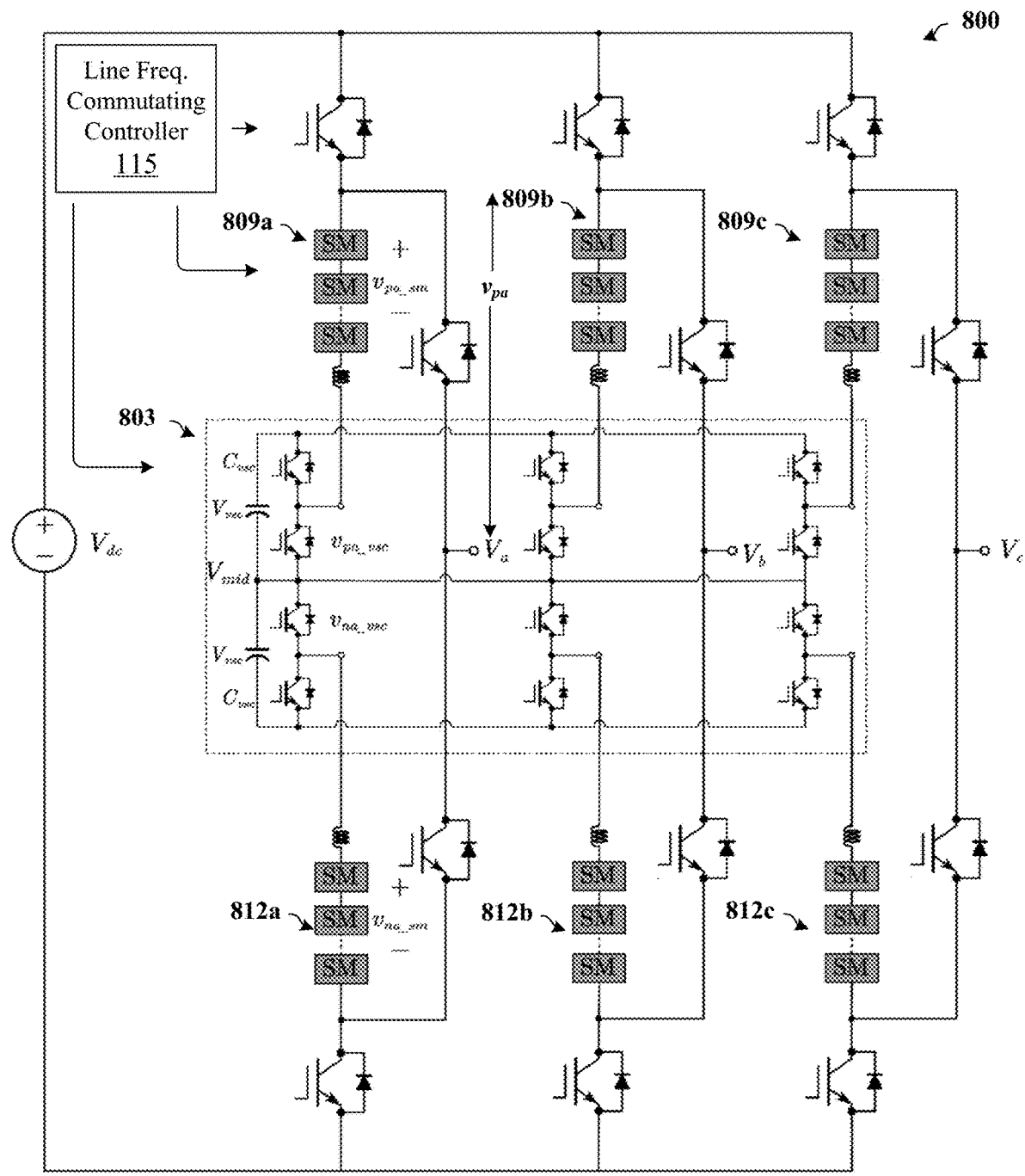
FIG. 8 illustrates another example of a multiphase hybrid modular multilevel converter with multiphase line frequency commutated voltage source converter according to embodiments of the present disclosure.

FIG. 8 shows an HMMC 800 that includes a multiphase line frequency commutated VSC 803. The HMMC 800 can operate in a manner analogous to the HMMC 700, except that the multiphase line frequency commutated VSC 803 includes an upper and lower portion that includes branch connections between arms of each branch and $V_{mid}$ or half $V_{dc}$, rather than to the upper and lower DC side nodes. Also, each branch of the HMMC 800 includes a first half-bridge rectifier that switches an upper arm of each branch between the upper DC-side node and the branch AC node, and a second half-bridge rectifier that switches a lower arm of each branch between the lower DC-side node and the branch AC node. In some cases, the upper multiphase line frequency commutated VSC and the lower multiphase line frequency commutated VSC can be considered separate VSC rather than upper and lower components of the single multiphase line frequency commutated VSC 803.

The HMMC 800 can include a number of branches for multiphase or polyphase operation, such as three branches for the three phase operation as shown. However, any number of phases, such as one phase, two phase, three phase, four phase, five phase, and so on can be used. The HMMC 800 can be capable of AC-to-DC and DC-to-AC conversions in the various embodiments. The HMMC 800 can take (or generate) a voltage $V_{dc}$ across upper and lower DC nodes. The HMMC 800 can take (or generate) three or more branch AC voltages $V_a$, $V_b$, $V_c$.

In each upper arm of a branch corresponding to a phase of the HMMC 800, a corresponding branch series submodule chain link 809a, 809b, 809c can be connected in series with an arm inductor. The branch series submodule chain link and arm inductor circuit section can be connected between a midpoint of the branch upper half-bridge of the HMMC 800 and a midpoint of each upper half-bridge circuit of the multiphase line frequency commutated VSC 803. In each lower arm of a branch corresponding to a phase of the HMMC 800, a corresponding branch series submodule chain link 812a, 812b, 812c can be connected in series with an arm inductor. The branch series submodule chain link and arm inductor circuit section can be connected between a midpoint of the branch lower half-bridge of the HMMC 800 and a midpoint of each lower half-bridge circuit of the multiphase line frequency commutated VSC 803.

Figure 9:
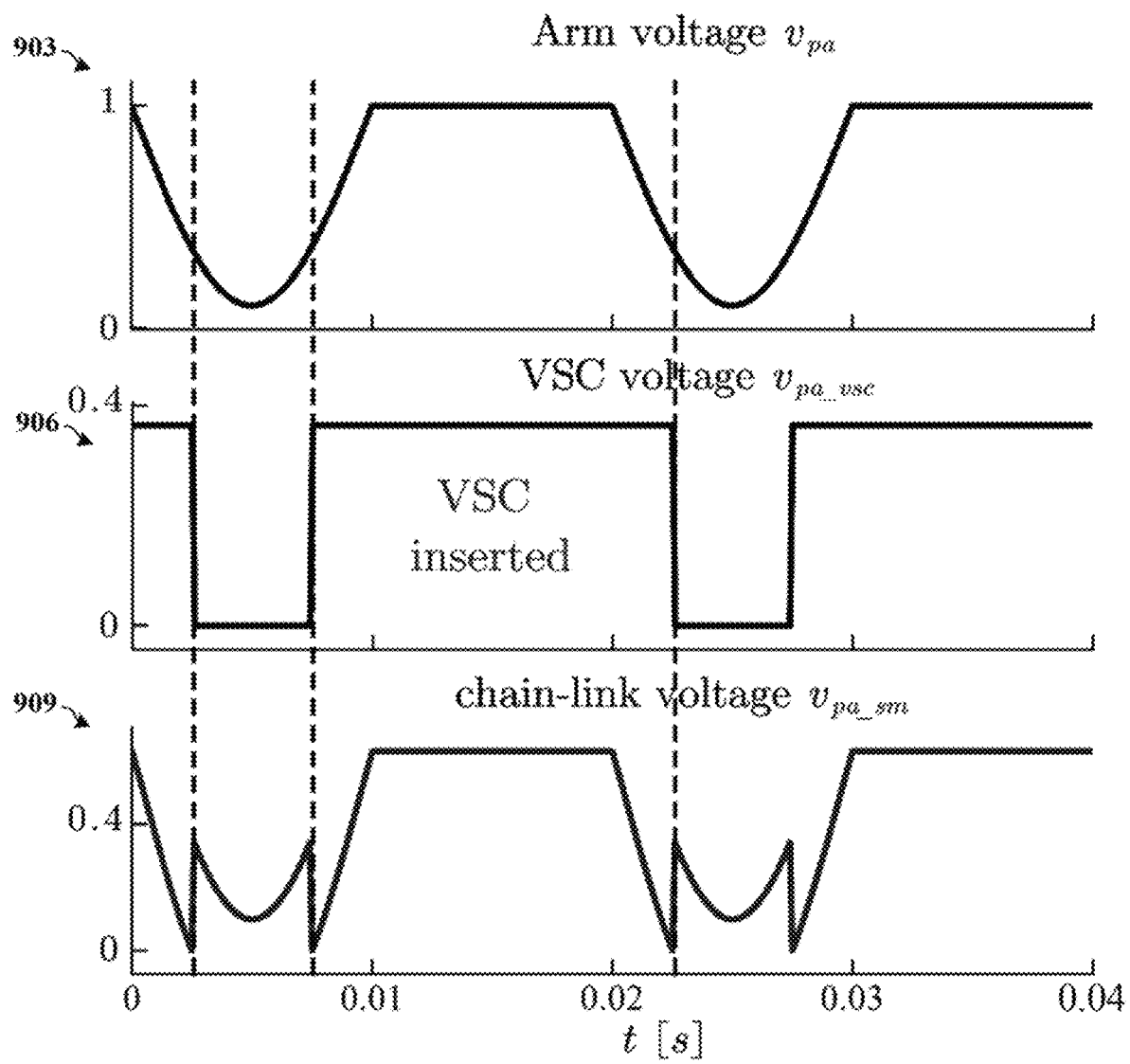
FIG. 9 illustrates an example of voltage graphs of an upper arm of a multiphase hybrid modular multilevel converter with multiphase line frequency commutated voltage source converter according to embodiments of the present disclosure.

FIG. 9 illustrates an example of voltage graphs of an upper arm of a multiphase hybrid modular multilevel converter such the HMMC 700 and the HMMC 800. FIG. 9 includes an example of voltage graphs 903, 906, and 909. An example of the arm voltage $v_{pa}$ or $v_{pa}^*$ is shown in graph 903. An example of the VSC voltage $v_{pa\_vsc}^*$ is shown in graph 906. An example of the chain-link or submodule voltage $v_{pa\_sm}^*$ is shown by graph 909. The value of VSC voltage $v_{pa\_vsc}^*$ can be the same as VSC capacitor voltage $V_{VSC}$ when the VSC capacitor is inserted and can be zero when the VSC capacitor is bypassed.

The line frequency commutating controller 115 can measure, detect, or otherwise check a voltage value for $V_{VSC}$. The line frequency commutating controller 115 can also continuously calculate $v_{pa}^*$ as described with respect to FIG. 2. When $v_{pa}^*$ is greater than or equal to VSC capacitor voltage $V_{VSC}$, the line frequency commutating controller 115 can generate VSC switching control signals that insert the VSC capacitor. In graph 909, when the VSC is inserted it can be seen that $v_{pa\_sm}^*$ is $v_{pa}^*$ decreased by $V_{VSC}$.

On the other hand, when calculated or reference arm voltage $v_{pa}^*$ is less than VSC capacitor voltage $V_{VSC}$, the line frequency commutating controller 115 can generate VSC switching control signals that bypass the VSC capacitor. In graph 909, when the VSC is bypassed it can be seen that $v_{pa\_sm}^*$ is the same as $v_{pa}^*$. It can be seen that the VSC is line-frequency commutated, and the voltage level is maintained even with a lower number of submodules.

Figure 10:
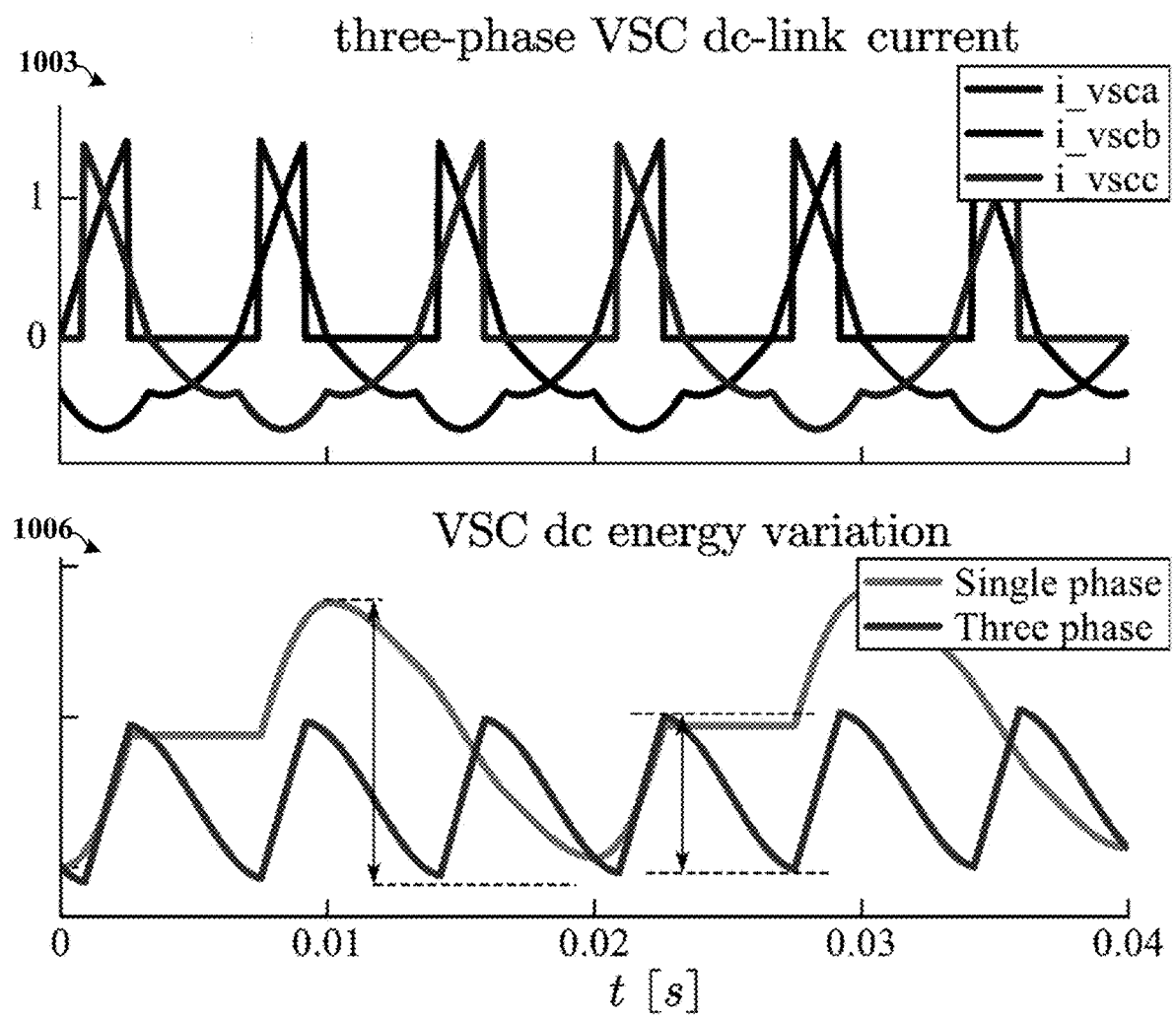
FIG. 10 illustrates an example of voltage source converter capacitor current and ripple cancellation of a multiphase hybrid modular multilevel converter with multiphase line frequency commutated voltage source converter according to embodiments of the present disclosure.

FIG. 10 illustrates an example of voltage source converter capacitor current and ripple cancellation of a multiphase hybrid modular multilevel converter such the HMMC 700 and the HMMC 800. FIG. 10 shows a three-phase VSC DC-link current graph 1003, and a VSC DC energy variation graph 1006 for single phase and three phase implementations. As can be seen in the VSC DC energy variation graph 1006, the capacitor ripple can be reduced by three phase cancellation. For example, the difference between maximum VSC energy and minimum VSC energy can be reduced. However, the VSC can operate in line-frequency, and the ripple is not totally eliminated. Using the principles described herein, capacitor size can be saved compared to conventional HMMC.

Figure 11:
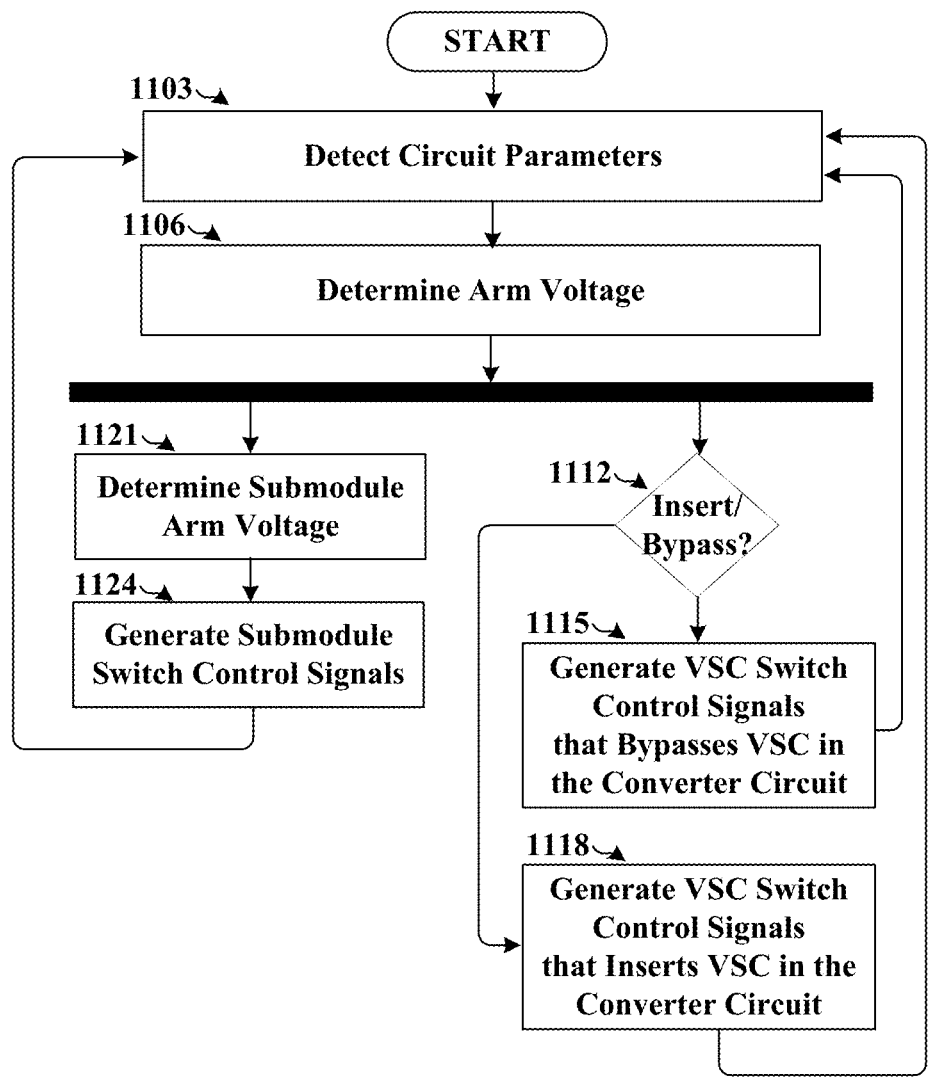
FIG. 11 illustrates an example flowchart of the operation of the line frequency commutating controller for modular multilevel converters and hybrid modular multilevel converters with multiphase voltage source converters according to embodiments of the present disclosure.

FIG. 11 illustrates an example flowchart of the operation of the line frequency commutating controller 115 for MMCs and HMMCs. While the flowchart describes operations as performed by the line frequency commutating controller 115, certain operations can also be performed at least in part by other components of the modular multilevel converters and hybrid modular multilevel converters. The flowchart generally describes how the line frequency commutating controller 115 controls VSC switch signals and submodule switching signals for a VSC for a particular arm of a particular branch of an MMC or an HMMC. However, the line frequency commutating controller 115 can control VSC switch signals and submodule switching signals for all branches of all arms of the MMC or HMMC. The line frequency commutating controller 115 can also control switching signals for the full-bridge and/or half-bridge circuits of the HMMCs, and other components.

In step 1103, the line frequency commutating controller 115 can detect circuit parameters including voltages and currents of any of the components of an MMC or an HMMC. The line frequency commutating controller 115 can detect these parameters using corresponding sensor devices. For example, the line frequency commutating controller 115 can detect or receive $v_{Cpa}$, $v_{Cna}$, and $v_a$, using corresponding voltage sensor devices. The voltage $v_{Cpa}$ can refer to actual or detected VSC capacitor voltage for the positive or upper arm of branch A. The voltage $v_{Cna}$ can refer to actual or detected VSC capacitor voltage for the negative or lower arm of branch A. The voltage $v_a$ can be actual AC voltage for branch A. The voltage $v_a^*$ can be calculated or reference AC voltage for branch A. The line frequency commutating controller 115 can detect or receive a VSC capacitor voltage $V_{VSC}$ as well.

In step 1106, the line frequency commutating controller 115 can determine or calculate a reference arm voltage $i_{pa}^*$. An arm energy balancing component 203 can take $v_{Cpa}$ and $v_{Cna}$ as inputs to calculate AC side current difference $i_{diff\_ac}^*$. A voltage averaging component 206 can take $v_{Cpa}$ and vow as inputs to calculate DC side current difference $i_{diff\_dc}^*$. An AC voltage regulator component 209 can take $v_a$ and $v_a^*$ as inputs to calculate AC current $i_a^*$. The current $i_{diff\_ac}^*$ can be mixed or multiplied with $i_{diff\_dc}^*$, and the mixed output current can be mixed with half or a fraction of AC current $i_a^*$ to calculate $i_{pa}^*$. A current loop component 215 can take calculated or reference $i_{pa}^*$ and measured $i_{pa}$ to determine $v_{clo}$, which can be mixed with $0.5V_{dc}$ and $v_a^*$ to calculate or determine $v_{pa}^*$. In other words, the line frequency commutating controller 115 can utilize the detected values and calculated values referred to above to determine $v_{pa}^*$, which it can then utilize as a control parameter to generate VSC switching signals that control the VSC insertion time $t_{vsc\_ins}$, as well as perform individual balancing and phase shift pulse width modulation for individual submodules of a series submodule chain link 109.

In step 1112, the line frequency commutating controller 115 can determine whether to insert or bypass the VSC. The line frequency commutating controller 115 can determine whether to insert or bypass the VSC using the control rules or operating principle described by equation set (3). If reference arm voltage $v_{pa}^*$ is less than the most recently detected VSC capacitor voltage $V_{VSC}$, the VSC capacitor is bypassed and $v_{pa\_sm}^*$ is equal to $v_{pa}^*$. However, when $v_{pa}^*$ is greater than or equal to VSC capacitor voltage $V_{VSC}$, the VSC capacitor is inserted and $v_{pa\_sm}^*$ is $v_{pa}^*$ minus $V_{VSC}$. If the VSC is to be bypassed, then the process can move to step 1115. If the VSC is to be inserted, then the process can move to step 1118.

In step 1115, the line frequency commutating controller 115 can generate VSC switch control signals that bypass the VSC or bypass the VSC capacitor. For example, in order to bypass the VSC capacitor, the line frequency commutating controller 115 can generate VSC switch control signals according to a bypass mode. In other words, the line frequency commutating controller 115 can generate VSC switch control signals that allow current to flow through $Q_{1\_vsc}$ and prevent current from flowing through $Q_{2\_vsc}$ (see FIG. 1B).

In step 1118, the line frequency commutating controller 115 can generate VSC switch control signals that insert the VSC or insert the VSC capacitor. For example, in order to insert the VSC capacitor, the line frequency commutating controller 115 can generate VSC switch control signals according to an insert mode. In other words, the line frequency commutating controller 115 can generate VSC switch control signals that prevent current from flowing through $Q_{1\_vsc}$ and allow current to flow through $Q_{2\_vsc}$ (see FIG. 1B).

In step 1121, the line frequency commutating controller 115 can determine submodule arm voltage. The line frequency commutating controller 115 can include a synthesizing component 224 that synthesizes $v_{pa\_sm}^*$ using $v_{pa}^*$ and $V_{VSC}$ as inputs, and can perform individual balancing and phase shift pulse width modulation for individual submodules of a series submodule chain link 109 based on the synthesized $v_{pa\_sm}^*$ value.

In step 1124, the line frequency commutating controller 115 can generate submodule switch control signals. The line frequency commutating controller 115 can balance and generate individual submodule switch control signals based on the synthesized $v_{pa\_sm}^*$ value.

The functionalities, services, programs, and computer instructions described for controllers, including the line frequency commutating controller 115 and other components described herein, can be embodied in software or code executed by general purpose hardware. The general purpose hardware can include one or more general purposes processors, with memory devices that store computer-readable instructions. In other cases, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although flowcharts can show a specific order of execution, it is understood that the order of execution can differ from that which is depicted. For example, the order of execution of two or more blocks can be scrambled relative to the order shown. The flowcharts can be viewed as depicting an example of a method implemented by a computing device. The flowchart can also be viewed as depicting an example of instructions executed in a computing device. Also, two or more blocks shown in succession can be executed concurrently or with partial concurrence. Further, in some embodiments, one or more of the blocks shown can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Also, the functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

The invention claimed is:

1. A power converter system comprising:
a multiphase converter comprising a plurality of branches corresponding to a number of phases of the power converter system;
a multiphase voltage source converter (VSC) comprising a plurality of VSC half-bridge circuits corresponding to the number of phases, wherein a VSC half-bridge circuit among the plurality of VSC half-bridge circuits is connected to insert or bypass a VSC capacitor in series with a plurality of submodules and an arm inductor of an arm of a branch of the multiphase converter; and
a controller device that:
detects a VSC capacitor voltage and a circuit parameter for the arm of the branch of the multiphase converter;
calculates, based at least in part on the circuit parameter, an arm voltage between a shared direct current (DC) node and a branch alternating current (AC) node of the multiphase converter; and
generates a VSC switch control signal that causes the VSC half-bridge circuit to insert or bypass the VSC capacitor based at least in part on a comparison between the arm voltage and the VSC capacitor voltage.

2. The power converter system of claim 1, wherein the plurality of half-bridge circuits share the VSC capacitor.

3. The power converter system of claim 1, wherein the controller device further:
determines a submodule arm voltage across the plurality of submodules; and
generates a submodule switch control signal based at least in part on the submodule arm voltage.

4. The power converter system of claim 1, wherein the controller device comprises a comparator circuit that compares the arm voltage and the VSC capacitor voltage.

5. The power converter system of claim 3, wherein the submodule switch control signal equalizes a positive area under an arm current curve to a negative area under the arm current curve over a time period that the VSC capacitor is inserted at a steady state working condition.

6. The power converter system of claim 3, wherein submodule switch control signal changes the VSC capacitor voltage to from an initial VSC capacitor voltage value to a balanced VSC capacitor voltage over time.

7. The power converter system of claim 1, wherein the multiphase converter comprises a modular multilevel converter or a hybrid modular multilevel converter.

8. A controller device for a multiphase converter, wherein the controller device executes instructions stored in a non-transitory memory that cause the controller device to at least:
detect a voltage source converter (VSC) capacitor voltage of a multiphase VSC of the multiphase converter, wherein the multiphase VSC comprises a plurality of VSC half-bridge circuits corresponding to a plurality of branches of the multiphase converter;
detect a circuit parameter for an arm of a branch of the multiphase converter;
calculate, based at least in part on the circuit parameter, an arm voltage for the arm of the branch of the multiphase converter; and
generate a VSC switch control signal that causes a VSC half-bridge circuit for the arm of the branch to insert or bypass a VSC capacitor of the multiphase converter based at least in part on a comparison between the arm voltage and the VSC capacitor voltage.

9. The controller device of claim 8, wherein the plurality of half-bridge circuits share, among the plurality of branches, a capacitor bank of comprising the VSC capacitor.

10. The controller device of claim 8, wherein the controller device further executes instructions that cause the controller to at least:
determine a submodule arm voltage across a plurality of submodules of the branch of the multiphase converter; and
generate a submodule switch control signal based at least in part on the submodule arm voltage.

11. The controller device of claim 8, wherein the controller device comprises a comparator circuit that compares the arm voltage and the VSC capacitor voltage.

12. The controller device of claim 10, wherein the submodule switch control signal equalizes a positive area under an arm current curve to a negative area under the arm current curve over a time period that the VSC capacitor is inserted at a steady state working condition.

13. The controller device of claim 10, wherein the submodule switch control signal changes the VSC capacitor voltage from an initial VSC capacitor voltage value to a balanced VSC capacitor voltage over time.

14. The controller device of claim 8, wherein the multiphase converter comprises a modular multilevel converter or a hybrid modular multilevel converter.

15. A method comprising:
receiving, by a controller device, a voltage source converter (VSC) capacitor voltage of a multiphase VSC of a multiphase converter, wherein the multiphase VSC comprises a plurality of half-bridge circuits corresponding to a plurality of branches of the multiphase converter;

receiving, by the controller device, a circuit parameter for an arm of a branch of the multiphase converter;

determining, based at least in part on the circuit parameter, an arm voltage for the arm of the branch of the multiphase converter; and generating, by the controller device, a VSC switch control signal that causes a half-bridge circuit among the plurality of half-bridge circuits to insert or bypass a VSC capacitor based at least in part on a comparison between the arm voltage and the VSC capacitor voltage.

16. The method of claim 15, wherein the plurality of half-bridge circuits share, among the plurality of branches, a capacitor bank of comprising the VSC capacitor.

17. The method of claim 15, further comprising:
determining a submodule arm voltage across a plurality of submodules of the branch of the multiphase converter; and generating a submodule switch control signal based at least in part on the submodule arm voltage.

18. The method of claim 15, wherein the controller device comprises a comparator circuit that compares the arm voltage and the VSC capacitor voltage.

19. The method of claim 17, wherein the submodule switch control signal equalizes a positive area under an arm current curve to a negative area under the arm current curve over a time period that the VSC capacitor is inserted at a steady state working condition.

20. The method of claim 17, wherein the submodule switch control signal changes the VSC capacitor voltage from an initial VSC capacitor voltage value to a balanced VSC capacitor voltage over time.

* * * * *